US008887743B2

(12) United States Patent
Molitor et al.

(10) Patent No.: US 8,887,743 B2
(45) Date of Patent: Nov. 18, 2014

(54) CHEMICAL DELIVERY SYSTEM AND PLATFORM

(75) Inventors: Christopher Molitor, Savage, MN (US); Gary A. Brown, Faribault, MN (US); David Kensinger, Richfield, MN (US)

(73) Assignee: Hydra-Flex, Inc., Burnsville, MN (US)

( * ) Notice: Subject to any disclaimer, the term of this patent is extended or adjusted under 35 U.S.C. 154(b) by 591 days.

(21) Appl. No.: 12/879,694

(22) Filed: Sep. 10, 2010

(65) Prior Publication Data

US 2011/0067738 A1 Mar. 24, 2011

Related U.S. Application Data (60) Provisional application No. 61/241,257, filed on Sep. 10, 2009.

(51) Int. Cl.
*B08B 3/00* (2006.01)
*B60S 3/04* (2006.01)
(52) U.S. Cl.
CPC .......................................... *B60S 3/04* (2013.01)
USPC .......................................................... 134/123
(58) Field of Classification Search
None
See application file for complete search history.

(56) References Cited

U.S. PATENT DOCUMENTS

| 3,307,744 | A | | 3/1967 | Burford |
| 4,067,665 | A | * | 1/1978 | Schwartzman ............... 417/245 |
| 5,033,489 | A | | 7/1991 | Ferre et al. |
| 5,219,422 | A | | 6/1993 | Sato |
| 5,419,347 | A | * | 5/1995 | Carruth ....................... 134/57 R |
| 5,439,020 | A | | 8/1995 | Lockhart |
| 6,113,007 | A | | 9/2000 | Bagnara et al. |
| 6,718,216 | B2 | | 4/2004 | Grier |
| 7,201,290 | B2 | | 4/2007 | Mehus et al. |
| 2003/0127534 | A1 | * | 7/2003 | Firestone ........................ 239/61 |
| 2007/0119217 | A1 | | 5/2007 | Worthington |
| 2008/0046278 | A1 | | 2/2008 | Sanville et al. |
| 2009/0090415 | A1 | | 4/2009 | Harris et al. |
| 2009/0139545 | A1 | | 6/2009 | Rowlands et al. |
| 2010/0186778 | A1 | | 7/2010 | Martin |

OTHER PUBLICATIONS

Application and File history for U.S. Appl. No. 12/961,041, filed Dec. 6, 2010, Inventors: Jaime L. Harris et al.

* cited by examiner

*Primary Examiner* — Jason Ko
(74) *Attorney, Agent, or Firm* — Patterson Thuente Pedersen, P.A.

(57) ABSTRACT

A chemical delivery system capable of handling a variety of concentrated chemicals in such a manner as to reduce the amount of service required to maintain the system. The system should be able to accurately and consistently deliver an appropriate quantity of concentrated chemicals as needed by the application where the system is utilized. Additionally, the system is configured such that the system occupies as little space as necessary.

13 Claims, 6 Drawing Sheets

CHEMICAL DELIVERY SYSTEM AND PLATFORM

PRIORITY CLAIM

The present application claims priority to U.S. Provisional Application Ser. No. 61/241,257, filed Sep. 10, 2009 and entitled, "CHEMICAL DELIVERY SYSTEM AND PLATFORM", which is hereby incorporated by reference in its entirety.

FIELD OF THE INVENTION

The present invention relates generally to the field of chemical dispensing systems. More specifically, the present invention is directed to a compact dispensing system for use in automated car washes, the system including at least one distribution manifold and a plurality of chemical injectors mounted to a shared platform containing a constant pressure system and a distribution manifold for providing a motive fluid such that only a minimum of system components are exposed to concentrated chemicals, while at the same time providing for consistent and accurate chemical dispensing.

BACKGROUND OF THE INVENTION

Since it is often inconvenient or expensive to transport and store chemical solutions at their intended working concentrations, various methods have been developed to mix concentrated chemicals into a flow stream of other fluids. Water is commonly used as a fluid to transport various chemicals which are intended to be used in a dilution ratio. Metering pumps, batch tanks, and pre-mixing solutions for spraying of concentrated chemicals are all typical methods currently in use today. Feeding chemicals into a system by using a venturi is also common. Because many chemicals are now distributed in a concentrated form the potential for increased wear to components due to corrosive effects of the concentrated chemicals or clogging of higher viscosity fluids as compared to a diluted solution has increased.

Currently in the marketplace, many chemical delivery systems typically also have extensive space requirements. For example, in the typical automated car wash there may be a need for a tank for a pre-mixed solution, multiple pumps, and valves associated with the variety of chemicals, detergents and other rinsing or washing agents. Generally, a "hydrominder" is used, in conjunction with a pump and valves to take a chemical from a tank or reservoir, to mix the chemical with water and deposit the solution in an additional tank before the diluted solution is pumped through a pump, typically air driven and applied through a sprayer. This process, and the associated equipment, may be required for each individual chemical employed by the system. Because most automatic car washes utilize several detergents or other chemicals the process results in a large quantity of tanks, pumps, valves, piping, and a significant space requirement. Representative prior art chemical delivery systems for automated car washes include U.S. Pat. Nos. 5,439,020, 6,113,007 and 6,718,216, each of which is herein incorporated by reference. The operating environment for a typical automated car wash also presents unique challenges to an installed chemical delivery system. Often these car wash systems are located in proximity to a service or fueling station. In certain locations these businesses may only be staffed by a single employee monitoring the station and working behind the counter. As such, an individual is not always available to provide service to the car wash if there are maintenance problems. In addition, it is desirable to employ equipment and components that are resistant to the combined corrosive effects of the chemicals in use due to the relatively small, enclosed spaces and high moisture environment. It is also desirable to reduce the number of components in a system, especially those that are prone to wear, such as pumps and mechanical valves. The combination of a harsh environment and component wear directly contributes to the need to perform service and maintenance on a car was system in order to ensure its operation. Finally, the typical Hydrominder installation is subject to fluctuations in supply water pressure such that dilution ratios can of water to chemical are varied.

Therefore, a need exists for further improvement to chemical delivery system designs that are capable of handling a variety of concentrated chemicals in such a manner as to reduce the amount of service required to maintain the system. The system should be able to accurately and consistently deliver an appropriate quantity of concentrated chemicals with appropriate dilution ratios as needed by the application and to provide an efficient system to dilute the chemicals to their proper strength before being utilized in the system. Additionally, the system should be configured such that it physically occupies as little space as necessary.

SUMMARY OF THE INVENTION

In order to address the needs described above, a representative chemical delivery system according to the present invention comprises a shared platform configured to disperse multiple chemicals in a way such that the chemicals do not pass through or otherwise contact a mechanical pump, valve, or other moving parts that are not made to resist the corrosive nature of the chemicals used by the system. Only the necessary piping or tubing, and a chemical injector at the end of the chemical dilution process, which are designed to properly handle the chemicals, are exposed to any contact with the chemical in concentrated form. The chemical delivery system of the present invention requires fewer moving parts than existing systems such as, for example, no valves for pre-mixing, no chemical metering pumps, and no hydrominder system. The system described here is capable of handling a plurality of chemicals in a space typically required for the handling of a single chemical in existing systems. By reducing the amount of required space for equipment there may be additional space for concentrated chemical storage, further reducing the need to regularly service the system. In addition to requiring less physical space, the use of venturi chemical injection provides a more consistent and accurate chemical measurement and delivery through the utilization of a constant pressure system including a pump and regulator to maintain a constant pressure for the motive fluid, i.e. water.

In one aspect, the present invention is directed to an integrated chemical delivery system that is engineered for ease of installation and to reduce overall space requirements. In one embodiment, the integrated chemical delivery system is skid mounted. In another alternative embodiment, the integrated chemical delivery system can include a support structure providing for wall mounting of the integrated chemical delivery system.

In another aspect, the present invention is directed to a method for dispensing chemicals within an automated car wash.

In yet another aspect, the present invention is directed to an automated car wash including a shared platform, chemical delivery system.

The above summary of the invention is not intended to describe each illustrated embodiment or every implementation of the present invention. The figures and the detailed description that follow more particularly exemplify these embodiments.

BRIEF DESCRIPTION OF THE DRAWINGS

The embodiments of the present invention may be more completely understood in consideration of the following detailed description of various embodiments in connection with the accompanying drawings, in which.

While the present invention is amenable to various modifications and alternative forms, specifics thereof have been shown by way of example in the drawings and will be described in detail. It should be understood, however, that the intention is not to limit the present invention to the particular embodiments described. On the contrary, the intention is to cover all modifications, equivalents, and alternatives falling within the spirit and scope of the present invention as defined by the appended claims.

DETAILED DESCRIPTION OF THE INVENTION

Figure 1:
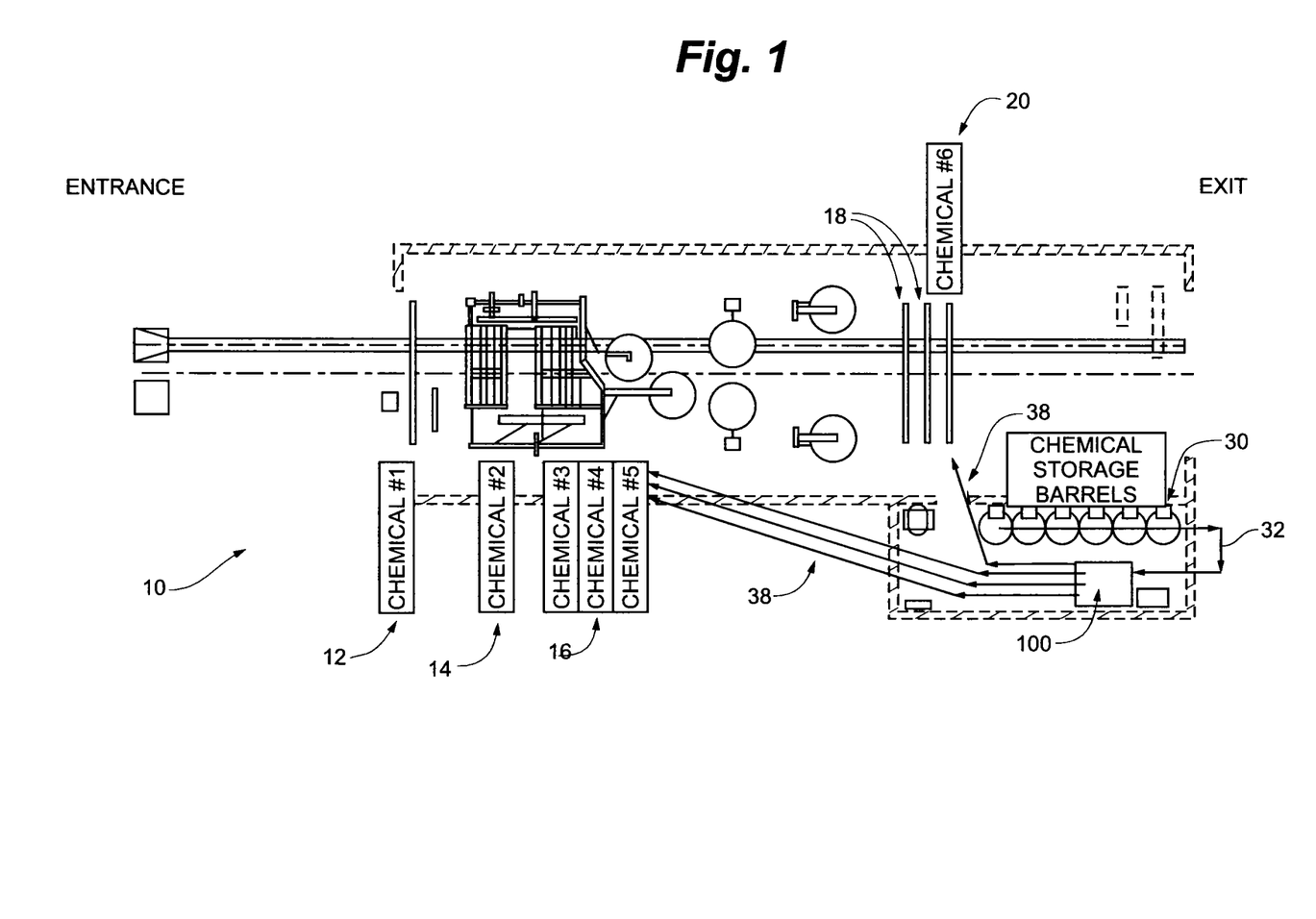
FIG. 1 is a plan view of a conventional tunnel car wash layout utilizing a plurality of chemicals and an integrated chemical delivery platform of the present invention.

Referring now to FIG. 1, a representative example of a conveyor tunnel car wash layout 10 is illustrated including a representative embodiment of an integrated chemical delivery system 100. The tunnel car wash layout 10 includes a plurality of distinct and sequential solution application areas including: a pre-soak area 12, a wheel cleaner area 14, a triple foam soap area 16, a spot-free rinse area 18, and a wax applicator area 20. Multiple chemical storage barrels 30 provide a source of concentrated chemical solution for each one of the different solution application areas. While illustrated as part of a tunnel car wash, it will be understood that integrated chemical delivery system 100 is equally applicable to use in other car wash settings including where an automobile to be cleaned remains in a generally stationary position such as self-service and in-bay automatic facilities.

Each chemical storage barrel 30 is connected to the integrated chemical delivery system 100 by a tube or conduit 32. Those skilled in the art will appreciate that a variety of piping or tubing solutions may be employed to connect the chemical storage barrels 30 to the integrated chemical delivery system 100. In one embodiment a plurality of plug-n-play or quick-couplers may be utilized to allow for easy replacement of empty chemical storage barrels or to reconfigure the integrated chemical delivery system 100 to match design or application changes to the tunnel car wash layout 10. The integrated chemical delivery system 100 is connected to a motive fluid source, generally a fresh water source. The integrated chemical delivery system 100 combines the concentrated chemical obtained from the chemical storage barrels 30 with the supplied fresh water, to deliver properly mixed chemical solutions to each of the solution application areas.

Figure 2:
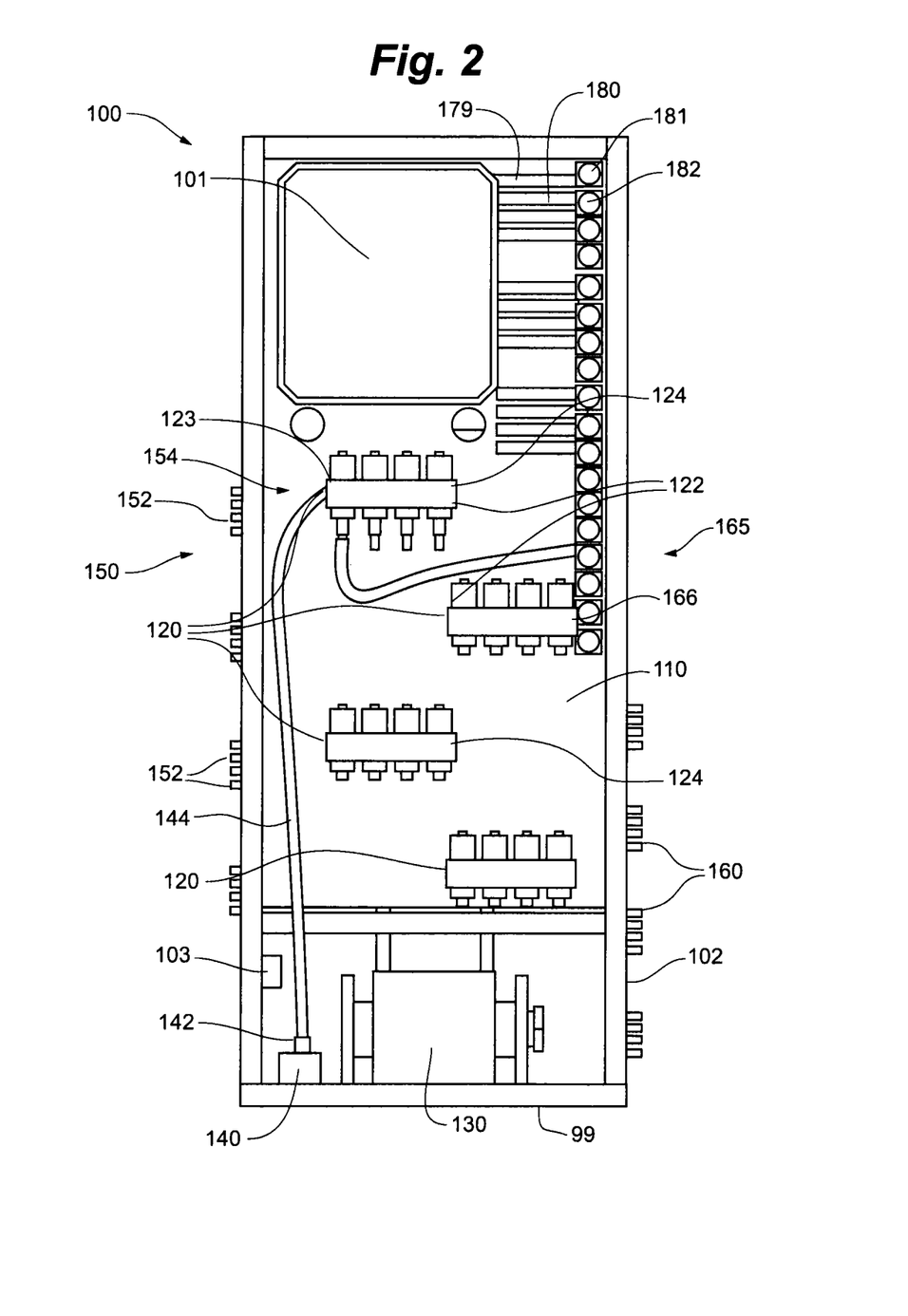
FIG. 2 is a front view of an integrated chemical delivery platform according to a representative embodiment of the invention.
Figure 3:
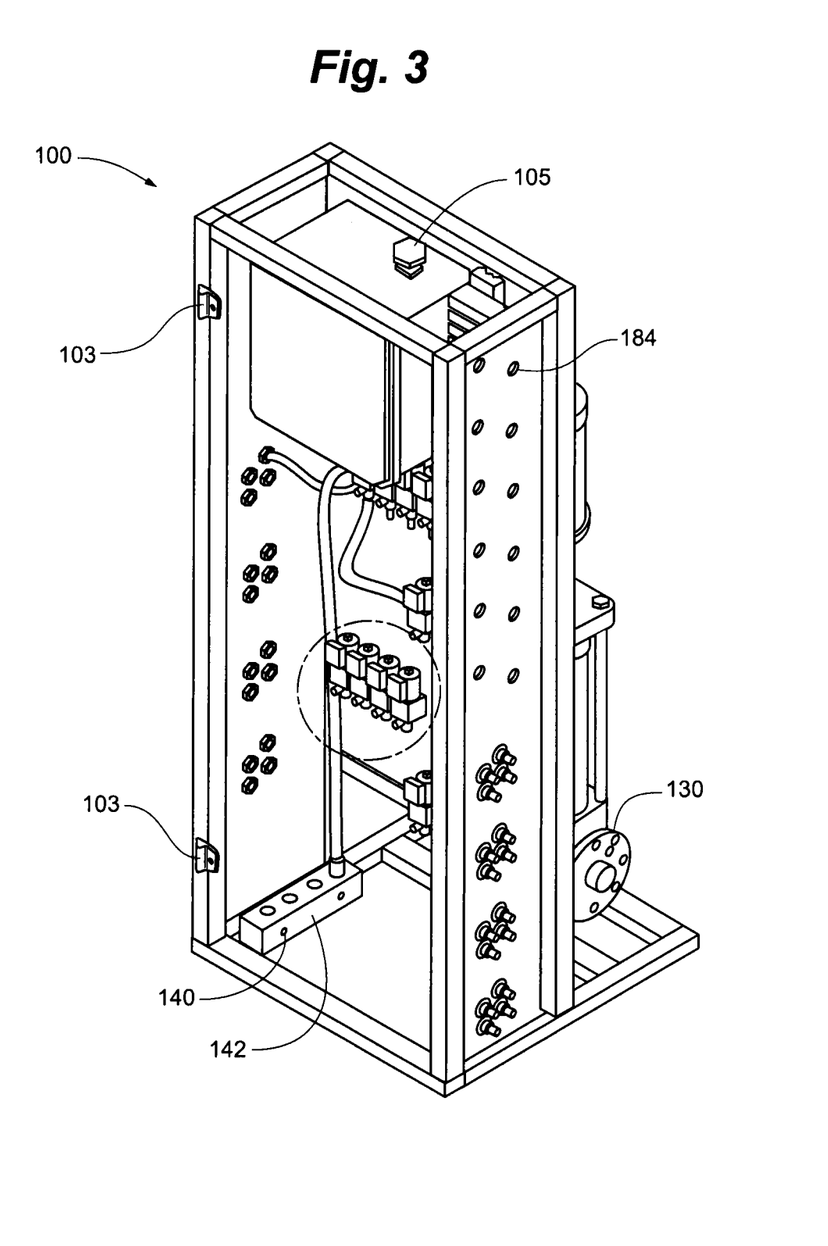
FIG. 3 is a perspective view of the integrated chemical delivery platform of FIG. 2 with the side and top access covers removed.
Figure 4:
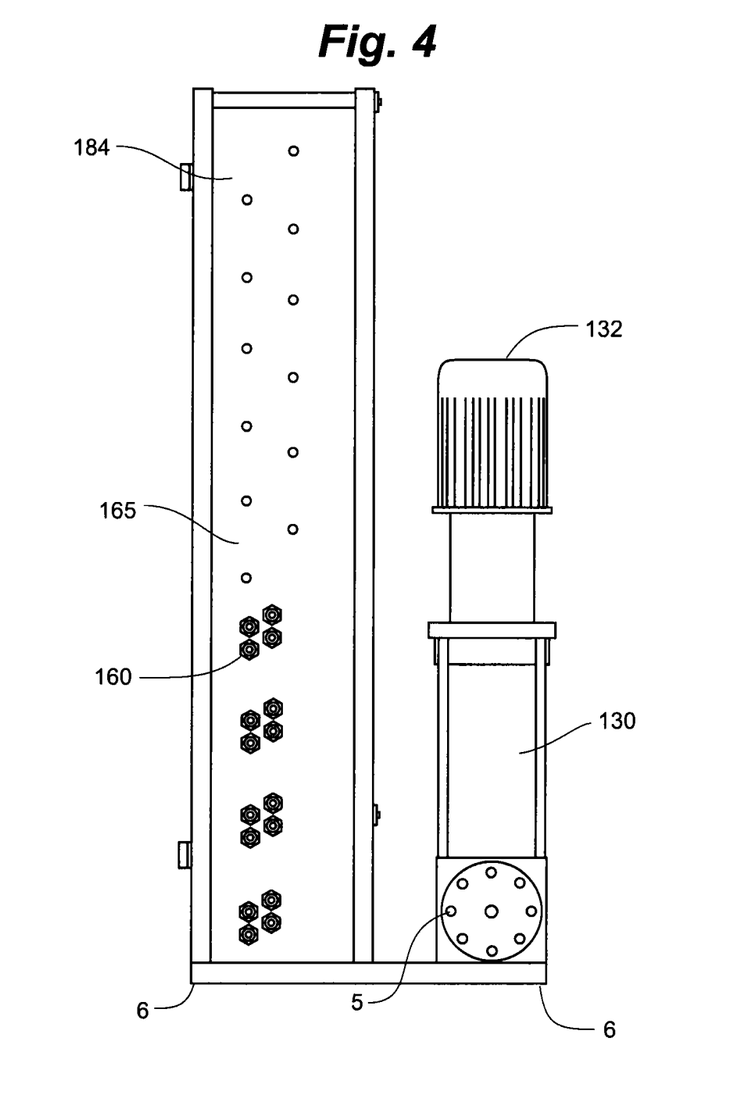
FIG. 4 is a side view of the integrated chemical delivery platform of FIG. 2 including four chemical delivery manifolds.

Referring now to FIGS. 2, 3 and 4, one representative embodiment of the integrated chemical delivery system 100 is illustrated in detail. In this example embodiment the integrated chemical delivery system 100 includes a mounting frame or skid 99 providing a common platform for a water tight electrical control panel 101, a system enclosing housing 102 and attaching points 103 for doors or panels (not depicted) to enclose the system and protect the internal components. As discussed above, these enclosure and panel components are generally desirable due to the wet environment that is typical of convention automatic car wash systems.

Within housing 102, four chemical delivery manifold assemblies 120 are mounted on a panel 110. The chemical delivery manifold assemblies 120 can be mounted with a variety of attachments including, but not limited to, rails, swivels, or other fasteners to allow easy adjustment, expansion or replacement of the chemical delivery manifold assemblies 120 and their associated components. As depicted in FIG. 2 it is desirable to provide adequate space 122 between the individual chemical delivery manifold assemblies 120 to allow for ease of service and the routing of supply and distribution lines. One example of a representative chemical delivery manifold assembly 120 is described in U.S. Patent Publication 2009/0090415A1, which is hereby incorporated by reference in its entirety.

The electrical control panel 101 can be utilized to operate the chemical delivery system 100 and to coordinate and direct the proper application of the individual chemicals in a desired sequence within tunnel car wash layout 10. The electrical control panel 101 can comprise a junction box with a water-tight housing for enclosing control components such as, for example, a programmable logic circuit or a computer processor based controller. Also, incoming and distributed electronic signals such as operator input, individual valve control, and pump control can be routed into and out of the electrical control panel. External to the electrical control panel, an emergency stop button 105 can be provided in order to allow a prompt shutdown of the system if necessary.

As illustrated in FIGS. 2, 3 and 4, chemical delivery system 100 can utilize a single pump 130 to supply a motive fluid source to the chemical delivery manifold assemblies 120. The supply pump 130 can comprise suitable pump designs capable of supplying constant flow and pressure. In one preferred embodiment, pump 130 can comprise a multi-stage, centrifugal booster pump though other pumps designs including diaphragm, impeller, rotary or piston pump designs can be utilized as well. The pump 130 generally supplies the motive fluid, i.e. water, from an inlet source to a distribution manifold 140, typically at a constant pressure that is generally greater than that of the source pressure. The distribution manifold 140 generally includes a plurality of distribution outlets 142. While not illustrate, it will be understood that chemical delivery system 100 can utilize a plurality of pumps 130 arranged in parallel to provide redundancy or to increase capacity.

As shown in FIG. 3, the illustrated embodiment includes four distribution outlets 142 disposed at the top of the distribution manifold 140. A greater or lesser number of distribution outlets 142 can be employed depending on the size and configuration of the chemical distribution system 100 and the tunnel car wash layout 10. The distribution manifold 140 can also contain any of a number of pressure regulators, flow meters, or bypass connections to facilitate the supply or regulation of the motive fluid into the chemical delivery system 100. While multiple distribution manifolds can be utilized in various embodiments of the present invention, the single distribution manifold 140 shown in this example provides a convenient mechanism to control and regulate the pressure and fluid flow rate of dilution liquid into the entire chemical delivery system 100.

The distribution outlets 142 are configured to supply fluid to one or more of the chemical delivery manifold assemblies 120 through a distribution line 144. Through the use of individual pressure regulators or other appropriate equipment at each distribution outlet 142 different water pressures or fluid flow rates can be supplied to a fluid inlet port 123 disposed on the individual chemical delivery manifold assemblies 120. Alternatively, if a uniform pressure or flow rate is desired for the entire system the various chemical delivery manifold assemblies 120 can be connected in series by a plurality of connecting distribution lines in combination with an connecting port 124 of the chemical delivery manifolds 120 that would otherwise be plugged or sealed.

The chemical inlet side 150 of the chemical delivery system 100 can include a variety of chemical inlet ports 152. These chemical inlet ports 152 can include any of a variety of fittings, connectors, quick-couplers, or quick-connect fittings known to those skilled in the art to be appropriate for handling detergents or other concentrated chemicals. The chemical inlet ports 152 typically supply concentrated individual chemicals to the various chemical delivery manifold assemblies 120 through a chemical supply hose 154. Alternatively, the chemical inlet side 150 can include a plurality of grommets or similar style openings allowing for a length of tubing to be run directly from a chemical barrel to a corresponding chemical delivery manifold assembly 120. The supplied chemical is diluted with the motive fluid in the chemical delivery manifold assembly 120. The diluted chemical solution is then supplied to a solution outlet port 160 on the solution outlet side 165 of the chemical delivery system 100 through a solution outlet hose 166.

In one embodiment, the chemical delivery system 100 can include a compressed-air handling assembly 179. The compressed-air handling assembly 179 can comprise an air inlet port 181 and a plurality of pneumatic manifolds 180, valves 182, a pressure regulator and air outlet ports 184. These pneumatic components can be used to distribute pressurized air to the system for foaming the chemical solutions or other applications where pressurized air can be utilized. In one embodiment, an external air-compressor can be attached to the air inlet port 181. The air inlet port 181 provides pressurized air to the pneumatic manifolds 180 that distribute the air to the air outlet ports 184 depending on the state of the valves 182. The valves 182 can be implemented as solenoid actuated air valves under the control of either an external controller or by controllers within the electrical control panel 101 integral to the chemical delivery system 100.

Figure 5:
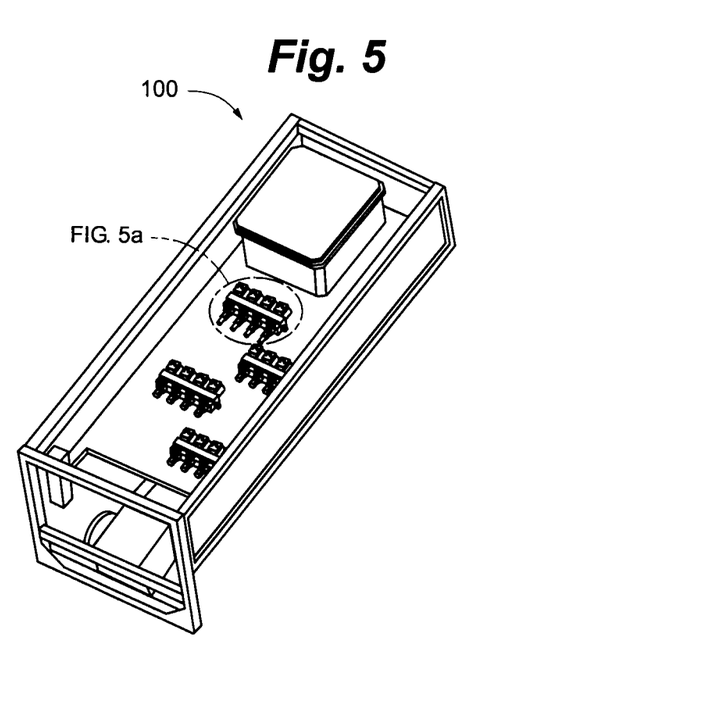
FIG. 5 is a perspective view of the integrated chemical delivery platform of FIG. 2.
Figure 5A:
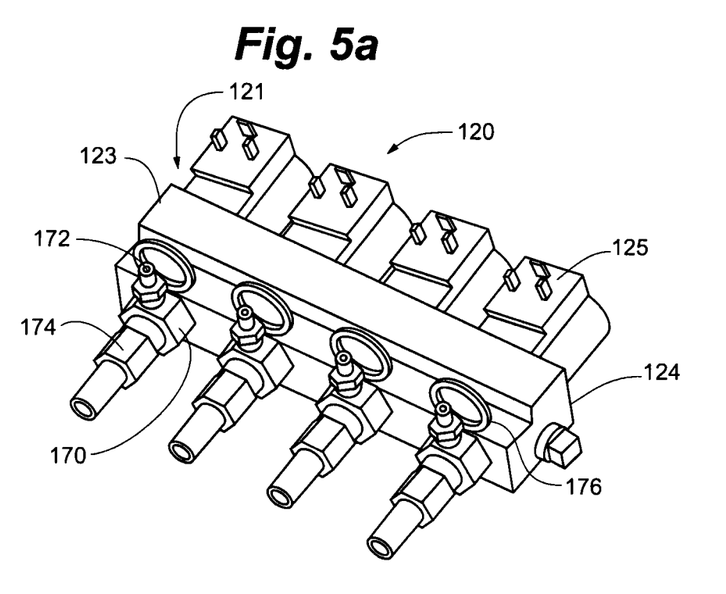
FIG. 5a is an enlarged perspective view of an embodiment of a chemical delivery manifold including four chemical injectors as illustrated at Detail 5a of FIG. 5.

FIGS. 5 and 5a illustrate a representative embodiment of the chemical delivery system 100 including a plurality of distribution manifold assemblies 120. As shown in FIG. 5a, the chemical distribution manifold assembly 120 can comprise a manifold body 121, a plurality of electrically actuated solenoids 125, and a plurality of chemical injectors 126. The fluid inlet port 123 allows for the motive fluid to be supplied from the distribution outlet 142 to the manifold body 121. The motive fluid is then directed into the individual chemical injectors 126 by controlling the state of the solenoids 125. The chemical injectors 126 can comprise a chemical inlet 172, a mixed solution outlet 174. The chemical injector 126 generally includes a venturi configuration (not depicted) for introducing the chemical into the motive fluid. The chemical injectors 126 can be coupled to the manifold body 121 by a variety of mechanisms. In this example a retention pin 176 is depicted to couple the individual chemical injectors 126 to the manifold body 121 such that they can be easily removed and replaced as needed.

The venturi configuration of the chemical injectors 126 is configured to draw a concentrated chemical in through the chemical inlet 172 and mix the chemical with the motive fluid provided to the fluid inlet port 123 of the manifold body 121. Those skilled in the art will recognize that venturi ports of various sizes and configurations will produce various suction pressures at the chemical inlet 172. The selection of individual chemical injectors 126 are generally based on the desired chemical concentration desired and the flow rate/pressure of the motive fluid through the system. The resulting mixed solution is then directed from the chemical injectors 126 through a solution outlet 174 and to the designated points of use within tunnel car wash layout 10. As long as there is a suitable difference in the inlet and outlet pressures, these venturi-based chemical delivery systems are simple, reliable and work very well. In addition, the use of chemical injectors 126 having a venturi configuration avoids exposing moving parts to the concentrated chemicals such that issues regarding chemical compatibility and wear can be avoided.

In certain environments it can be desirable to supply heated water for washing, especially in the winter months of northern climates. It is therefore one embodiment of the present invention to include a heating assembly (not depicted) to the system. A variety of heating assemblies can be used in combination with the water pump mechanism 130 or the distribution manifold 140 of the chemical delivery system 100. By supplying a heated motive liquid to the system at a point before the motive fluid is distributed by the distribution manifold 140 only a single, higher efficiency, heater assembly is required. Alternatively, if a previously installed system is configured with heaters for the various mixed solutions the chemical delivery system 100 can be configured to augment that heating process by operating at a lower temperature or without a heating unit.

Figure 6:
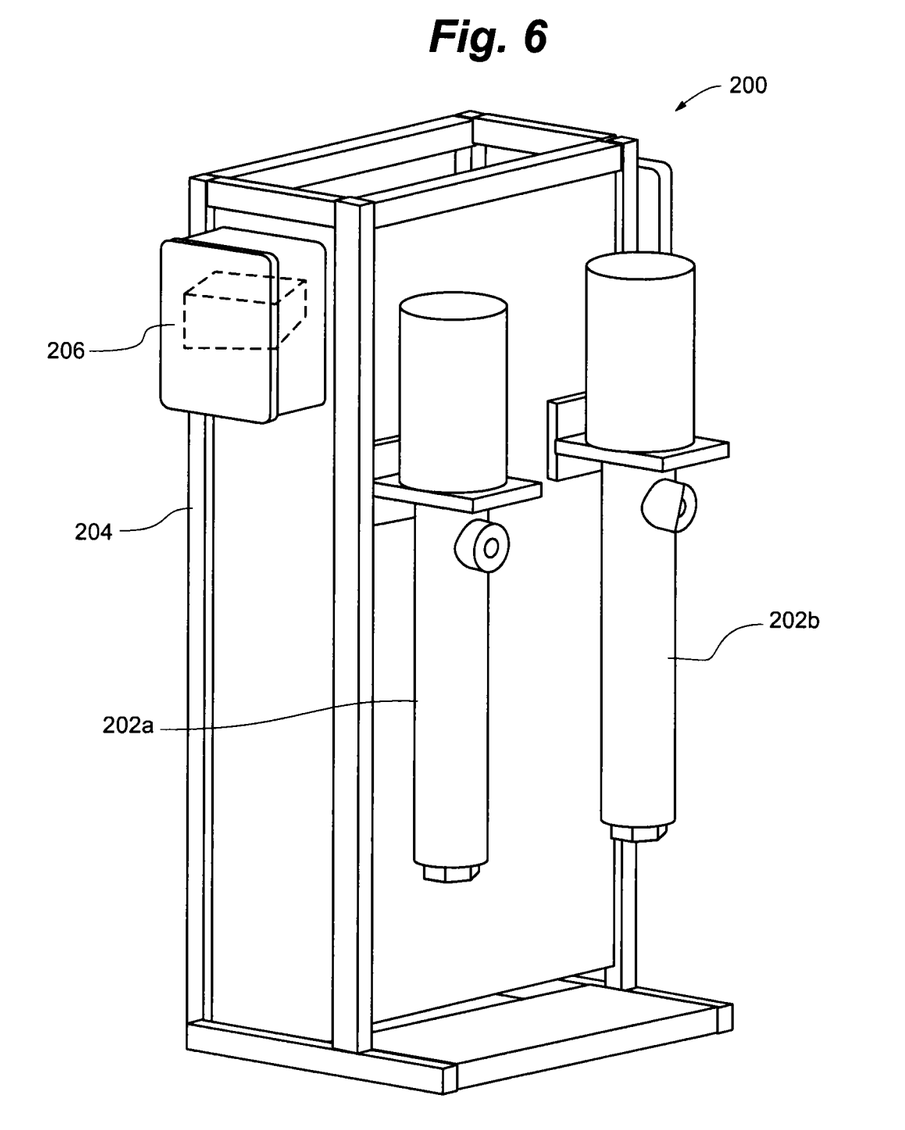
FIG. 6 is a perspective view of an integrated chemical delivery platform utilizing a pair of supply pumps according to a representative embodiment of the invention.

In an alternative embodiment illustrated in FIG. 6, an integrated chemical delivery system 200 can substantially resemble and perform similarly to integrated chemical delivery system 100 but with the single supply pump 130 replaced with a pair of supply pumps 202a and 202b. Supply pumps 202a, 202b generally comprise the same pump design and pump horsepower such that a carwash can stock a single replacement pump or rebuild kit capable of replacing or repairing either of supply pumps 202a, 202b. Supply pumps 202a, 202b are configured for parallel operation with each pump capable of supply one-half of a peak motive fluid requirement for the car wash. In addition, integrated chemical delivery system 200 can comprise a mounting frame 204 configured to allow the integrated chemical delivery system 200 to be wall mounted so as to reduce the overall footprint required for integrated chemical delivery system 200.

Utilizing the pair of supply pumps 202a, 202b offers a variety of advantages including having built in redundancy should one of the supply pumps 202a, 202b fail. While a failed one of the supply pumps is repaired or replaced, the car wash, while being forced to operate at a reduced capacity, can remain operational while maintenance is completed. In some embodiments, integrated chemical delivery system 200 can further comprise a control processor 206 such as, for example, a Programmable Logic Controller, that selectively operates and cycles the use of supply pumps 202a, 202b. In this manner, operational savings can be achieved by operating only one of supply pumps 202a, 202b during non-peak usage times for the carwash and to only operate both supply pumps 202a, 202b when the full supply of the motive fluid is required. In addition, the control processor 206 can selectively cycle the supply pumps 202a, 202b such that the work load and operational time is balanced. IN addition, control processor 206 can conduct additional monitoring and notice functions that allow an operator to more carefully monitor and track operation of the integrated chemical delivery system 200. For example, suitable measuring instruments such as, for example, pressure transducers, flow monitors, level sensors, hour meters and the like can report ongoing information to the control processor 206. Based on this information, control processor 206 can continually update an operator regarding current status, track chemical usage and determine when maintenance or restocking of chemical is necessary.

The foregoing descriptions present numerous specific details that provide a thorough understanding of various embodiments of the invention. It will be apparent to one skilled in the art that various embodiments, having been disclosed herein, can be practiced without some or all of these specific details. In other instances, known components have not been described in detail in order to avoid unnecessarily obscuring the present invention. It is to be understood that even though numerous characteristics and advantages of various embodiments are set forth in the foregoing description, together with details of the structure and function of various embodiments, this disclosure is illustrative only. Other embodiments can be constructed that nevertheless employ the principles and spirit of the present invention. Accordingly, this application is intended to cover any adaptations or variations of the invention. It is manifestly intended that this invention be limited only by the following claims and equivalents thereof.

What is claimed is:

1. A chemical delivery system for distributing chemicals within a car wash, comprising:
   a motive fluid source including a pressurized motive fluid;
   a distribution manifold having a plurality of distribution ports, and
   at least one chemical delivery manifold including a plurality of venturi injectors, each venturi injector have a motive fluid inlet, a chemical inlet and a mixed solution outlet, each venturi injector adapted for operation at the direction of an individual control signal selectively controlling flow of the pressurized motive fluid through each venturi injector, and wherein each venturi injector is adapted for independently introducing a different concentrated chemical solution,
   wherein the pressurized motive fluid is supplied to the distribution manifold and to each chemical delivery manifold through a corresponding distribution port, the pressurized motive fluid being provided through a distribution line to each motive fluid inlet at a constant pressure such that the corresponding concentrated chemical solution is mixed into the pressurized motive fluid within each venturi injector; and
   wherein the distribution manifold and the at least one chemical delivery manifold are mounted on a common frame.

2. The chemical delivery system of claim 1, wherein the motive fluid source comprises a multi-stage centrifugal booster pump.

3. The chemical delivery system of claim 1, wherein the motive fluid source comprises a pair of supply pumps configured for parallel operation, and wherein each supply pump is capable of pressurizing one-half of a maximum flow requirement of the pressurized motive fluid.

4. The chemical delivery system of claim 1, wherein a concentrated chemical is drawn through each chemical inlet by a venturi configuration in each chemical injector.

5. The chemical delivery system of claim 1, further comprising:
   a water-tight control panel distributing the individual control signals to each venturi injector.

6. The chemical delivery system of claim 1, further comprising:
   a compressed air handling assembly.

7. A car wash comprising the chemical delivery system of claim 1.

8. A car wash chemical system, comprising:
   a distribution manifold having a plurality of distribution ports,
   at least one distribution line fluidly connected to one of the distribution ports for distributing a motive fluid from the distribution manifold;
   at least one chemical delivery manifold having a chemical manifold body including an inlet port and a plurality of chemical injectors, each chemical injector including a valve adapted for operation at the direction of an individual control signal that independently actuates each valve to selectively control flow of the motive fluid through each chemical injector, each chemical injector being individually fluidly connected to a concentrated chemical for individually mixing the concentrated chemical into the motive fluid to form a mixed solution within each chemical injector and wherein each injector includes a mixed solution outlet for selectively directing the mixed solution of each chemical injector to a selected application area.

9. The car wash chemical system of claim 8, wherein the distribution manifold and the at least one chemical delivery manifold are contained on a shared mounting frame.

10. The car wash chemical system of claim 9, further comprising:
    at least one pump positioned on the mounting frame, the at least one pump for pressurizing the motive fluid prior to the motive fluid entering the distribution manifold.

11. The car wash chemical system of claim 9, further comprising:
    a control processor providing the individual control signal to each chemical injector.

12. A tunnel car wash, comprising the car wash chemical system of claim 9.

13. The tunnel car wash of claim 12, wherein the mixed solution of individual chemical injectors is directed to differing application areas, and wherein the application areas are selected from the group consisting essentially of: a pre-soak area, a wheel cleaner area, a foam soap area, a rinse area and wax applicator area.

* * * * *